United States Patent [19]

Moritomo

[11] Patent Number: 5,724,511
[45] Date of Patent: Mar. 3, 1998

[54] REMOTE MAINTENANCE CONTROL SYSTEM

[75] Inventor: Haruo Moritomo, Kanagawa, Japan

[73] Assignee: Fujitsu Limited, Kanagawa, Japan

[21] Appl. No.: 519,042

[22] Filed: Aug. 24, 1995

[30] Foreign Application Priority Data

Dec. 26, 1994 [JP] Japan .................................. 6-322215

[51] Int. Cl.⁶ ..................................................... H02G 1/00
[52] U.S. Cl. ........................... 395/200.09; 340/825.06
[58] Field of Search ........................... 364/514 R, 550, 364/571.07; 340/825.06, 825.16, 825.29; 371/57.1, 20.1; 379/74, 105; 395/200.09, 200.2, 200.02

[56] References Cited

U.S. PATENT DOCUMENTS

| | | | |
|---|---|---|---|
| 4,737,950 | 4/1988 | Fechalos | 370/434 |
| 4,769,833 | 9/1988 | Farleigh et al. | 379/105 |
| 5,276,529 | 1/1994 | Williams | 358/406 |
| 5,491,473 | 2/1996 | Gilbert | 340/870.01 |

*Primary Examiner*—Ellis B. Ramirez
*Assistant Examiner*—Thomas Peeso
*Attorney, Agent, or Firm*—Helfgott & Karas, PC

[57] ABSTRACT

A terminal for a maintenance is connected via a local area network (LAN) to a wideband switching equipment. An address such as an IP address is allocated to each of a plurality of wideband switching equipments, and a virtual channel connection for transferring maintenance data to between the plurality of wideband switching equipments. Each control unit of the plurality of wideband switching equipments is provided with a table for registering an address of a connected party to make the address corresponding to an interface unit accommodating a wideband line. The control unit performs control to select whether to transfer the maintenance data to other wideband switching equipment or to the maintenance terminal connected via the LAN with reference to this table.

6 Claims, 8 Drawing Sheets

REMOTE MAINTENANCE CONTROL SYSTEM

BACKGROUND OF THE INVENTION

The present invention relates to a remote maintenance control system for maintaining a plurality of wideband switching equipments with a comparatively simple construction.

A wideband network constructed by connecting a plurality of wideband switching equipments through a wideband line is suited to multimedia communication services. It is considered that, e.g., an ATM (Asynchronous Transfer Mode) system is applied to these multimedia communication services. It is desired in that wideband network that the wideband switching equipment be maintained from a remote area.

A remote maintenance console performs a remote maintenance via an analog-only line. An I/O unit of the switching equipment is connected to the remote maintenance console through a route such as MODEM→analog-only line→MODEM.

On the other hand, if via a public line, the maintenance console is connected to the I/O unit of the switching equipment from the remote maintenance console is automatically or manually called via a public network, a MODEM-to-MODEM connecting path is formed in the public network. Further, the switching equipments form a path for connecting a line interface to a subscriber's circuit. The remote maintenance console is thereby connected to the maintenance console, and, therefore, the maintenance console sends maintenance data such as status-of-operation data and trouble data of the switching equipment in accordance with a request for the maintenance data from the remote maintenance console. The remote maintenance console receives these items of data and performs remote maintenance of the switching equipment.

According to the above-mentioned conventional example, however, it is required that the dedicated line network and the public network is well serviced in order to conduct the remote maintenance. Further, a dialing function for connecting by designating the maintenance console from the remote maintenance console is indispensable.

Moreover, in case such a remote maintenance system is applied to the wideband network, the public network and the dedicated line network through the wideband network are not well serviced at present, and, hence, the above-described system construction can not be applied as it is.

Also, in a large-scale network, a known system is equipped with, e.g., a centralized maintenance monitoring center which maintains and monitors the large-scale network by collecting pieces of maintenance data of respective nodes of the large-scale network. However a problem arises in which the construction becomes more expensive with a more complicated configuration. Further, there is spread a local area network (LAN) which connects a variety of terminal devices, and it can be considered that such a LAN coexists with the wideband network based on the above ATM. Accordingly, in such a coexisting state of the LAN with the wideband network, the remote maintenance of the wideband switching equipment is required to be improved in terms of an efficiency and an economical aspect.

It is an object of the present invention to perform remote maintenance of wideband switching equipments which constitute a wideband network through a maintenance terminal connected to a LAN.

SUMMARY OF THE INVENTION

A remote maintenance control system comprises a plurality of wideband switching equipments connected via a wideband line and a terminal for maintenance, connected via a local area network (LAN) to at least one of the plurality of wideband switching equipments. The remote maintenance control system also comprises an interface unit accommodating the wideband line, a table for registering an address of a connected party to make the address corresponding to the interface unit and a control unit, provided in each of the wideband switching equipments, for allocating the address to each of the wideband switching equipments, setting a virtual channel connection for transferring an item of maintenance data between the plurality of wideband switching equipments and selecting whether to transfer the maintenance data to other wideband switching equipment or to transfer the maintenance data to the maintenance terminal connected via the LAN with reference to the table.

Further, an address of the connected party through the interface unit and an item of valid/invalid data of the relevant address are set in the table provided in a control unit of the wideband switching equipment.

Also, an address of the maintenance data requesting party is registered per interface unit receiving the maintenance data request in the table provided in the control unit of the wideband switching equipment, and the registered address can be cleared by transmitting the maintenance data responding to the maintenance data request.

Further, an address of the maintenance data requesting party and a timer value can be registered corresponding to the interface unit receiving this maintenance data request in the table provided in the control unit of the wideband switching equipment. The registered address is cleared by transmitting the maintenance data responding to this maintenance data request and, in case an overtime happens by decrementing the timer value with a fixed period, the registered address can be also cleared.

According to the present invention, the maintenance terminal together with other terminal is connected via the LAN to the wideband switching equipment. When the maintenance terminal issues the maintenance data request, the control unit transmits the maintenance data to the maintenance data requested party through a virtual channel connection for transferring the maintenance data. The control unit of the wideband switching equipment that receives this item of maintenance data checks whether or not it is given to a self wideband switching equipment with reference to the table. If given to the self wideband switching equipment, the control units create and transmit the maintenance data which conform to a content of the maintenance data request. The control unit of the wideband switching equipment that receives this item of maintenance data transfers the data to the maintenance terminal via the LAN with reference to the table.

The address of the connected party is registered corresponding to the interface in the table. The validness and invalidness of the address are set therein to avoid an overlap receipt of the maintenance data. If invalid, the control units determines that there is no connected party but does not transfer the maintenance data or the like.

An address of the maintenance data requested party is registered in the table when receiving the maintenance data request. Then, when sending back the maintenance data in response to this maintenance data request, the registered address is cleared. Accordingly, the registering operation in the table can be omitted when starting up the system.

Further, the timer value as well as the address is registered in the table. This timer value is decremented with the fixed period, and, if the overtime happens, the registered address is cleared. Hence, in a case where no answer to the maintenance data request is made, if the address is registered upon receiving a re-request, the maintenance data can be transmitted to that address.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 8A:
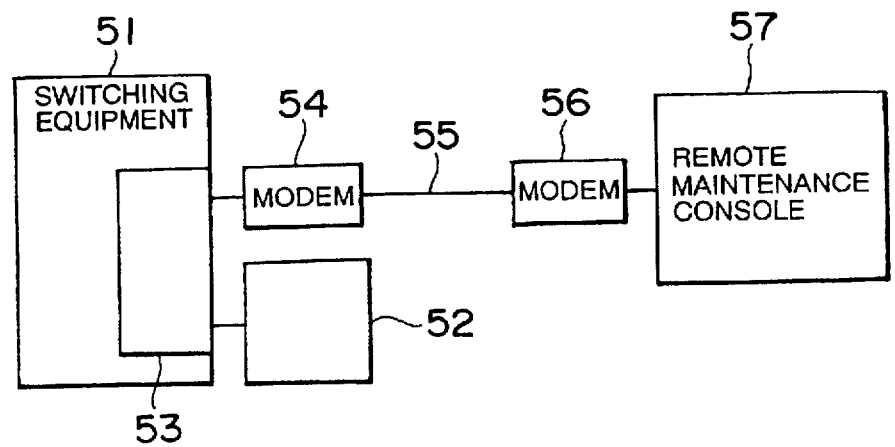
FIG. 8A and 8B are explanatory diagrams illustrating conventional examples.
Figure 8B:
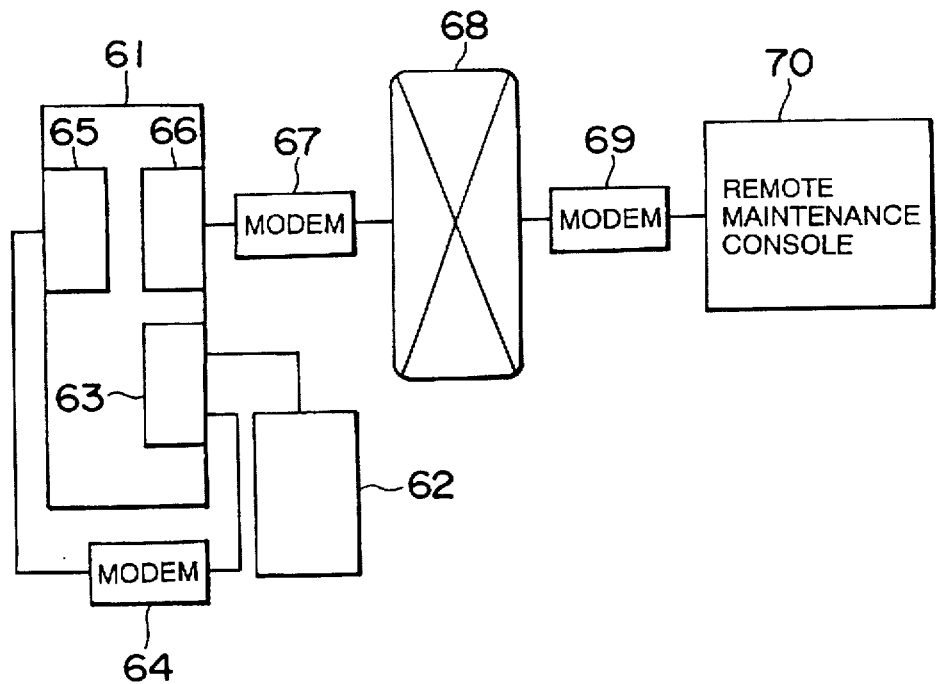

FIG. 8 is an explanatory diagram showing a conventional example. FIG. 8(A) illustrates a case where remote maintenance is carried out through an analog-only line, and FIG. 8(B) shows a case where the remote maintenance is performed through a public network. Referring again to FIG. 8(A), a system includes a switching equipment 51, a maintenance console 52, an I/O unit 53, a MODEM 54, an address-only line 55, a MODEM 56 and a remote maintenance console 57.

The remote maintenance console 57 requests an item of maintenance data from the maintenance console 52 via a route led to the maintenance console 52 connected with the I/O through the MODEM 56, the analog-only line 55 and the MODEM 54. The maintenance console 52 transmits, to the remote maintenance console 57, the maintenance data such as pieces of status-of-operation data, trouble data, etc. of the switching equipment 51. The remote maintenance console 57 is thereby capable of performing remote maintenance of the switching equipment 51.

Referring further to FIG. 8(B), a system includes a switching equipment 61, a maintenance console 62, an I/O unit 63, MODEMs 64, 67 and 69, a subscriber's circuit 65, a line interface 66, a public network 68 and a remote maintenance console 70.

The maintenance console connected to the I/O unit 63 of the switching equipment 61 is automatically or manually called from the remote maintenance console 70 via the public network 68. A path connecting the MODEMs 67, 69 to each other is thereby formed in the public network 68. Further, the switching equipment 61 forms a path connecting the line interface 66 and the subscriber's circuit 65 to each other. The remote maintenance console 70 and the maintenance console 62 are thereby connected to each other, and the maintenance console 62 transmits the maintenance data such as the state-of-operation data, the trouble data, etc. of the switching equipment 61 in response to a request for the maintenance data from the remote control maintenance console 70. The remote maintenance console 70 is capable of performing the remote maintenance of the switching equipment 61 by receiving these items of data.

In the conventional examples shown in FIGS. 8(A) and 8(B), the dedicated line network and the public network need to be well serviced in order to perform the remote maintenance, and a dialing function for designating and connecting the maintenance consoles 52, 62 from the remote maintenance consoles 57, 70 is indispensable. When such a remote maintenance system is applied to a wideband network, because of not completely being equipped with the public network and the dedicated line network in the wideband network at the present time, the constructions shown in FIGS. 8(A) and 8(B) can not be applied as they are.

In contrast with this, an outline of a remote maintenance control system according to the present invention will be described with reference to FIG. 1. This system includes a plurality of wideband switching equipments 1, 1a connected to each other via a wideband line 9 and a terminal 11 for a maintenance that is connected via a local area network (LAN) 10 to at least one of the plurality of wideband switching equipments 1, 1a. An address such as an IP address, etc., is allocated to each of the plurality of wideband switching equipments 1, 1a, and a virtual channel connection for transferring maintenance data is set between the plurality of wideband switching equipments 1, 1a. Besides, control units 2, 2a of the plurality of wideband switching equipments 1, 1a are provided with tables 3, 3a for registering an address of a connected party so as to make the address corresponding to an interface unit 5 accommodating a wideband line 9. The control units 2, 2a have such a construction as to perform the control of selecting whether to transfer the maintenance data to other wideband switching equipment or to the maintenance terminal 11 connected via a local area network 10 with reference to the tables 3, 3a.

Moreover, the system is constructed such that valid/invalid data of the address of the connected party through the interface unit 5 are set corresponding to the interface unit 5 in the tables 3, 3a provided in the control units 2, 2a of the wideband switching equipments 1, 1a.

Besides, the address of the maintenance data requesting party is registered corresponding to the interface unit receiving this maintenance data request, and the registered address is cleared by transmitting the maintenance data responding to this maintenance data request.

Further, the construction is such that an address of a maintenance data requesting party and a timer value are registered corresponding to the interface unit receiving this maintenance data request in the tables 3, 3a provided in the control units 2, 2a of the wideband switching equipments 1, 1a. The construction is also such that the maintenance data in response to this maintenance data request are transmitted, thereby clearing the registered address, and, if over the time by decrementing the timer value with a fixed period, the registered address can be cleared.

The maintenance terminal 11 is connected together with other terminal 12 via the LAN 10 to the wideband switching equipment 1. When the maintenance terminal 11 transmits the maintenance data request, the control unit 2 transfers the maintenance data request via a virtual channel connection for transferring the maintenance data to the maintenance data requesting party with reference to the table 3. The control unit of the wideband switching equipment, which receives this maintenance data request, checks whether or not it targets on the self wideband switching equipment with reference to the table. The control unit, when targeting on the self wideband switching equipment, creates and transmits an item of maintenance data conforming to a content of the maintenance data request. The control unit 2 of the wideband switching equipment 1, which receives this item of maintenance data, transfers it to the maintenance terminal 11 via the LAN 10 with reference to the table 3.

Further, an address of a connected party is registered corresponding to an interface unit 5 in the tables 3, 3a, and, for avoiding an overlap receipt of the maintenance data, a validness or invalidness of the address is set. If invalid, a determination is that there is no connected party, and the maintenance data or the like are not transferred.

Further, the address of the maintenance data requesting party is, when receiving the maintenance data request, registered in the tables 3, 3a under the control of the control unit. Then, when sending back the maintenance data in response to this maintenance data request, the registered address is cleared. Accordingly, when starting up the system, the registering operation in the tables 3, 3a can be omitted.

Further, the timer value as well as the address is registered in the table 3, 3a. This timer value is decremented with a fixed period, and, if over the time, the registered address is cleared. Accordingly, if no answer to the maintenance data request is made, and when the address is registered upon receiving a re-request, the maintenance data can be transmitted to this address.

Next, the embodiment will be discussed in greater detail.

Figure 1:
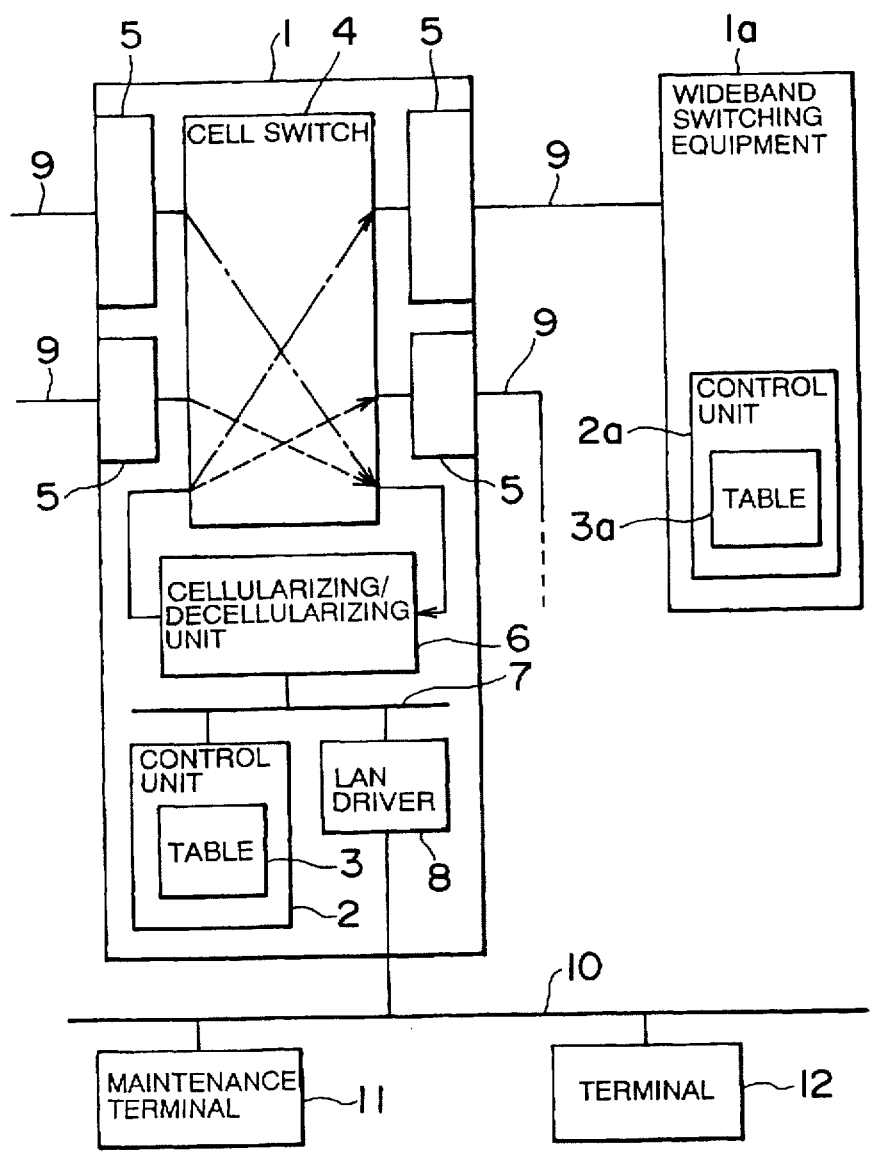
FIG. 1 is a diagram of assistance in explaining one embodiment of the present invention.

FIG. 1 is an explanatory diagram of one embodiment of the present invention. A system includes wideband switching equipments 1, 1a, control units 2, 2a, tables 3, 3a, a cell switch 4, an interface unit 5, a segmentation and reassembly unit, a system bus 7, a LAN driver, a wideband line 9, a LAN 10, a maintenance terminal 11 and a general terminal 12.

The plurality of wideband switching equipments 1, 1a are connected to each other via the wideband line 9, thus constituting a wideband network. Note that only two sets of wideband switching equipments 1, 1a are illustrated in FIG. 1, but, further, a multiplicity of wideband switching equipments are disposed. Further, this embodiment presents a case where an ATM system is applied. This ATM system is a switching system for transferring the data while being stored in a packet known as a cell. This cell has a 53-byte length composed of a 5-byte header part and a 48-byte data field. Data about destinations of the cell are added to the 5-byte header part in accordance with VPI (Virtual Path Identifier) and VCI (Virtual Channel Identifier).

Further, addresses are respectively allocated to the plurality of wideband switching equipments 1, 1a, by an allocation part 21, 21a and a virtual connection for transferring the maintenance data is set between the wideband switching equipments by a setting part 22, 22a. Further, the control units 2, 2a register an address of the wideband switching equipment of the connected party while making the address corresponding to the interface unit 5 accommodating the wideband line 9. Also, the control unit of the wideband switching equipment accommodating the LAN includes the table 3, 3a in which a LAN address is registered. The address in this case can be set as an IP (Internet Protocol) address. Further, when the wideband line 9 is set as an ATM line, the interface unit 5 turns out to be an ATM interface unit. Also, the control units 2, 2a transfer the data, e.g., in a frame format between the segmentation and reassembly unit 6 and the control units 2, 2a or the LAN driver 8 via the system bus 7. Besides, the control units 2, 2a perform control to check whether the maintenance data is transferred to the maintenance terminal 11 or other wideband switching equipment via the LAN by a selection part 23, 23a with reference to the tables 3, 3a.

Further, a CDMA/CD system (Ethernet) standardized by IEEE802.3 is applicable to the LAN 10 connected to the wideband switching equipment 1 via the LAN driver 8 thereof. Also, a cable of the LAN 10 may involve the use of, e.g., a coaxial cable such as 10BASE2, 10BASE5, etc. and a non-shield twisted pair line such as 10BASE-T, etc. It is a general practice in an economical sense to use 10BASE-T. Further, a transmitting velocity when using such a cable is on the order of 10 Mbps. Shown herein is a case where the maintenance terminal 11 and the general terminal 12 are connected to this LAN 10. Further, the local area network according to the present invention includes a network known as a wide area network (WAN).

Given as an application protocol of a TCP/IP (Transmission Control Protocol/Internet Protocol) are, e.g., an FTP (File Transfer Protocol) for a file transfer, an SMTP (Simple Mail Transfer Protocol) of an electronic mail and a TELNET (Telecommunication Network) of a virtual terminal. According to the present invention, this TELNET is applicable. That is, pieces of maintenance data of a wideband switching equipment in a remote area are collected through the maintenance terminal 11 by applying a remote virtual terminal function of the TELNET. Further, the segmentation and reassembly unit 6 transforms the frame given from the system bus into the cell constructed of the 48-byte data field and the 5-byte header part and transmits the cell to the wideband line 9 through the cell switch 4. Further, the segmentation and reassembly unit 6 reassembles the frame by use of the data of the cell data filed through the cell switch 4 from the wideband line 9 and transfers the thus reassembled frame to the control unit 2 or the LAN driver 8 via the system bus 7. Also, a one-dotted chain line and a dotted line in the cell switch 4 indicate cell transfer routes based on, e.g., a virtual channel connection for transferring the maintenance data.

Figure 2:
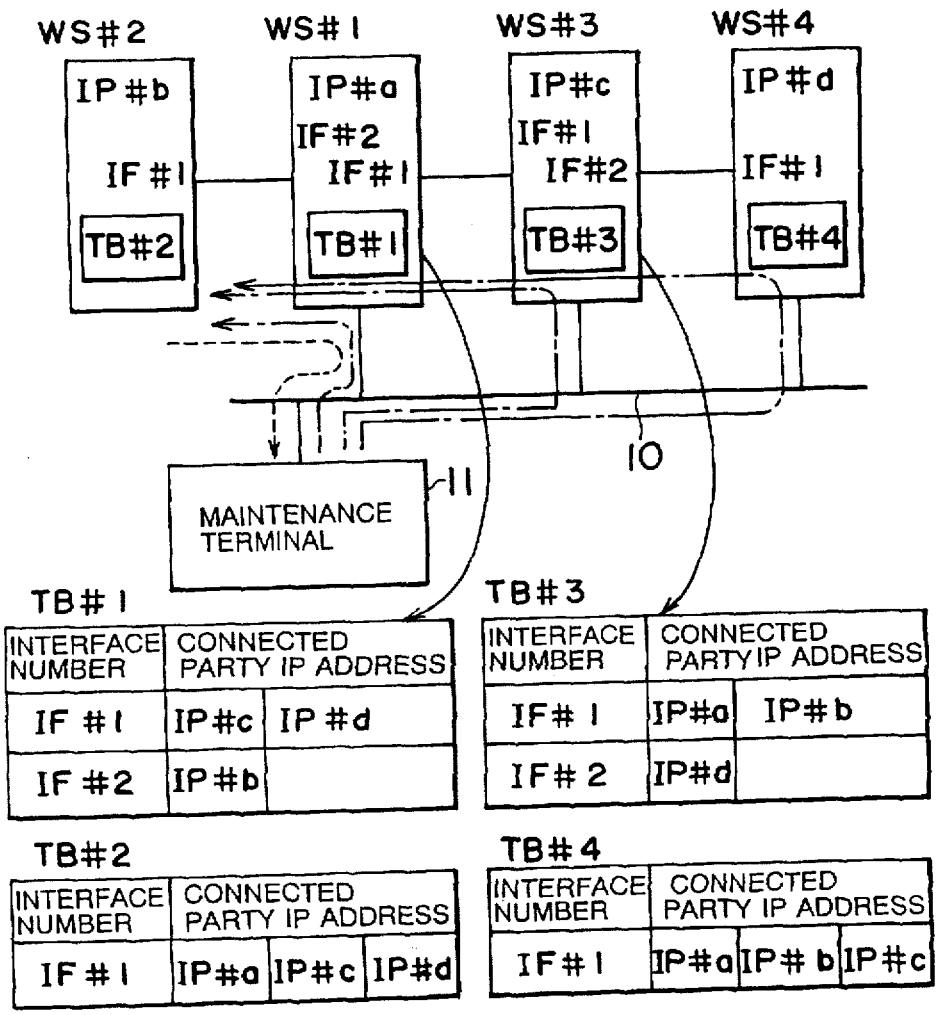
FIG. 2 is an explanatory diagram of a table in one embodiment of the present invention.

FIG. 2 is an explanatory diagram of the table in one embodiment of the present invention, wherein wideband switching equipments WS#1–WS#4 to which IP addresses IP#a –IP#d are allocated are connected through the wideband line 9, and IF#1, IF#2 are set as interface numbers of the interface units accommodating the wideband lines 9. Further, the LAN 10 is connected to each of the wideband switching equipments WS#1, WS#3, WS#4, and, besides, the maintenance terminal 11 is connected thereto. The control units of the respective wideband switching equipments WS#1–WS#4 are provided with tables TB#1–TB#4.

The tables TB#1–TB#4 contain, for instance, as illustrated below, the interface numbers IF#1, IF#2 and the IP addresses of the connected parties that are registered corresponding to each other. For example, the IP addresses IP#a, IP#c, IP#d showing the wideband switching equipments WS#1, WS#3, WS#4 are registered as connected parties of the interface number IF#1 in the table TB#2 of the wideband switching equipment WS#2. Further, the IP address IP#b of the wideband switching equipment WS#2 is registered as a connected party of the interface number IF#2 in the table TB#1 of the wideband switching equipment WS#1. The control units of the wideband switching equipments WS#1–WS#4 are capable of transmitting and receiving the maintenance data, etc. with reference to these tables.

Figure 3:
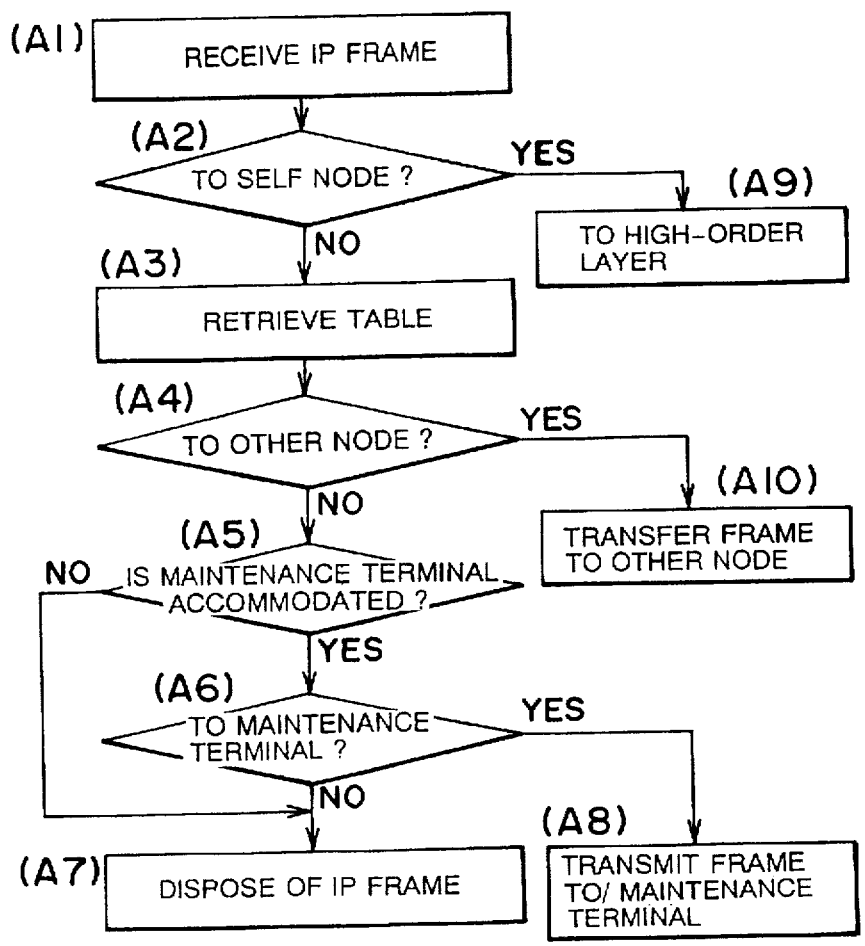
FIG. 3 is a flowchart showing processes when receiving a frame in one embodiment of the present invention.

FIG. 3 is a flowchart of processes when receiving the frame in one embodiment of the present invention. The control unit of each wideband switching equipment receives the IP frame (A1) and checks whether or not the IP frame is given to a self-node by making a comparison with an IP address of the self-node (A2). The control unit, if given to the self-node, delivers the processing over to the high-order layer (A9) and, if not coincident as a result of the comparison with the IP address of the self-node, retrieves the table (A3). Then, the control unit checks whether the frame is given to other node or not (A4) and, if given to other node, transfers it to other node (A10). That is, the segmentation and reassembly unit 6 in FIG. 1 cellularizes the frame and transmits the cell to other wideband switching equipment through the cell switch 4 from the interface unit 5 via the wideband line 9.

Whereas if not to other node, the control unit checks whether or not the maintenance terminal is accommodated therein (A5). If the maintenance terminal, e.g., the terminal 11 is not accommodated through the LAN as in the case of the wideband switching equipment WS#2 of FIG. 2, this IP frame is, because of having no destination, to be disposed of (A7). Whereas if the maintenance terminal 11 is accommodated, for example, the control unit checks whether or not the frame is given to the maintenance terminal by applying a subnetwork mask of the maintenance terminal for the received IP frame (A6). If not to the maintenance terminal, that IP frame is disposed of (A7). Whereas if the IP frame is given to the maintenance terminal, the frame is transferred to the maintenance terminal 11 (A8). That is, as in the case of receiving the maintenance data from other wideband switching equipment, the IP frame is transferred to the maintenance terminal 11 via the LAN 10 from the LAN driver 8 of FIG. 1.

Figure 4:
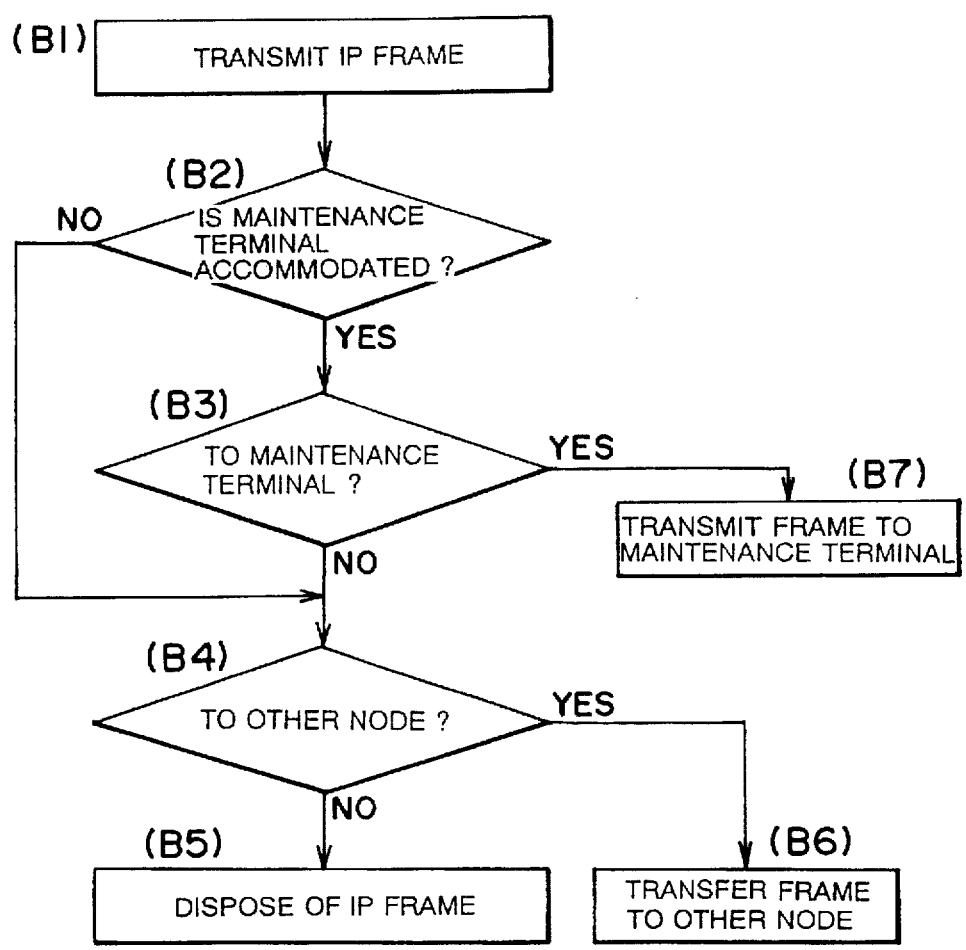
FIG. 4 is a flowchart of processes when transmitting the frame in one embodiment of the present invention.

FIG. 4 is a flowchart of processes when transmitting the frame in one embodiment of the present invention. The control unit of the wideband switching equipment, upon receiving an indication for transmit the IP frame from the high-order layer (B1), checks whether or not the self wideband switching equipment accommodates the maintenance terminal 11 (B2). The control unit, if the maintenance terminal is accommodated therein, compares an IP address of the IP frame with an IP address of the LAN and checks whether or not the frame is given to the maintenance terminal (B3). The control unit, if coincident as a result of the comparison, transmits the frame to that maintenance terminal 11 because of its being given to the maintenance terminal (B7). That is, the IP frame is transferred to the maintenance terminal 11 through the LAN 10 from the LAN driver 8.

Whereas if the IP frame is not given to the maintenance terminal, the control unit checks whether or not the frame is given to other node with reference to the table (B4). The control unit, if not to other node, disposes of that IP frame (B5) but, whereas if given to other node, transfers the frame to other mode (B6). Namely, the frame is, because of the maintenance data given to the maintenance terminal accommodated in other wideband switching equipment, cellularized by the segmentation and reassembly unit 6 of FIG. 1, and the cell is transmitted via the wideband line 9 to other wideband switching equipment through the cell switch 4.

As described above, the maintenance terminal 11 is capable of collecting pieces of maintenance data of the respective wideband switching equipments through the LAN 10. In this case, for example, the wideband switching equipments WS#1, WS#3, WS#4 are connected through the LAN 10, and, therefore, it follows that a plurality of routes indicated by one-dotted chain lines are directed to the wideband switching equipment WS#2 of FIG. 2. Then, only the IP address IP#a of the wideband switching equipment WS#1 is set valid in the table TB#2 of the control unit of the wideband switching equipment WS#2, while other IP addresses IP#c, IP#d are set invalid therein. Accordingly, the wideband switching equipment WS#2 is capable of effecting the control to transmit and receive the maintenance data on the assumption that only the wideband switching equipment WS#1 exists. Further, the maintenance data from the wideband switching equipment WS#2 can be received by the maintenance terminal 11 via the dotted-line route.

Additionally, a route through the wideband line 9 and a route through the LAN 10 are also formed with respect to the wideband switching equipments WS#3, WS#4 connected via the LAN 10 to the wideband switching equipment WS#1. The maintenance data can be, however, set in the tables TB#3, TB#4 so as to make valid only the maintenance data through the LAN 10 but invalid the maintenance data through the wideband line 9. With this setting, it is possible to avoid the overlap transmission and receipt of the maintenance data. Note that if there exists a transfer route of the maintenance data on the plurality of routes via the LAN as well as via the wideband line, the route via the wideband line needs the segmentation and reassembly processes, and hence the processing becomes easier by making valid the transfer route via the LAN.

Figure 5:
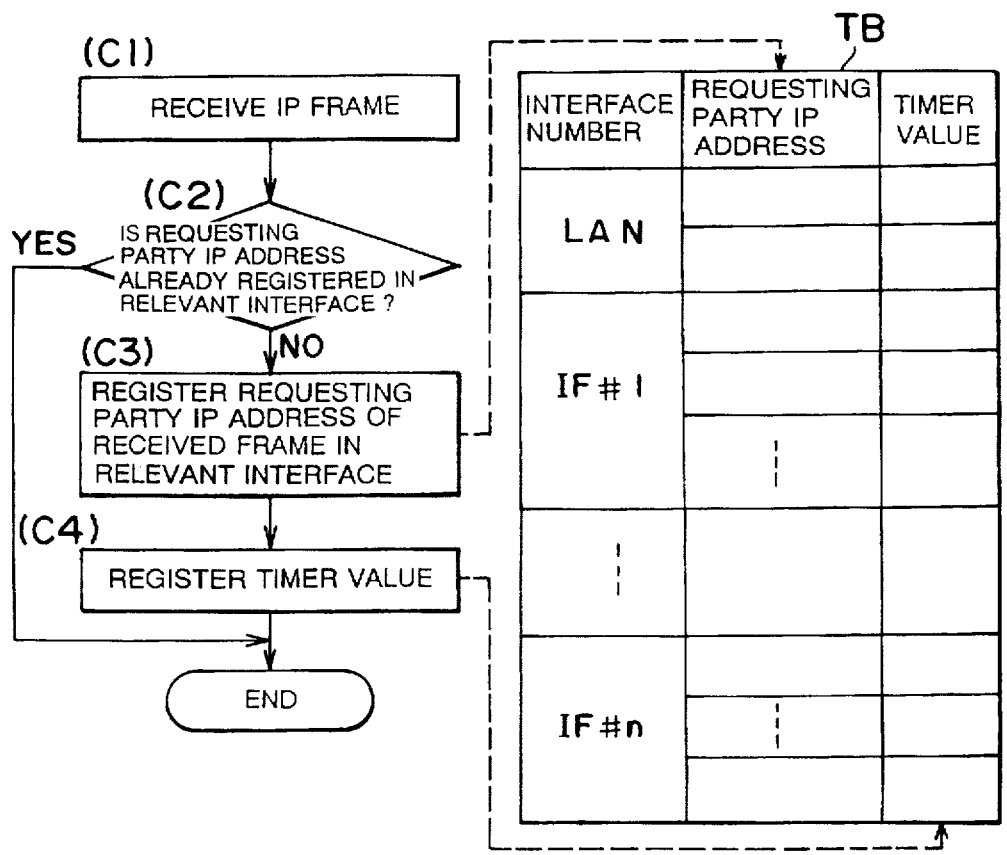
FIG. 5 is a flowchart of processes when receiving the frame in another embodiment of the present invention.

FIG. 5 is a flowchart of processes when receiving the frame in another embodiment of the present invention. The construction is such that requesting party IP addresses and timer values can be set corresponding to the interface numbers LAN, IF#1–IF#n in the table TB of the control unit of the wideband switching equipment. The control unit, upon receiving the IP frame (C1), checks whether or not the requesting party IP address has already been registered in the relevant interface (C2), and, if registered therein, a management of the table TB is ended as it is.

Whereas if not registered, the requesting party IP address of the received frame is registered in the relevant interface. For instance, an IP address, e.g., IP#j of a transmitting party with respect to the frame received via the wideband line 9 with the interface number IF#1 is registered corresponding to IF#1 in the table TB (C3), and there is set a timer value on the assumption of a time till a response frame thereto is transmitted (C4). This timer value is decremented with a fixed period, and, due to an overtime, a requesting party IP address IP#i registered previously is cleared. On the occasion of such an overtime, the IP address registered is cleared, thereby making it possible to prevent extra IP addresses from being accumulated.

Figure 6:
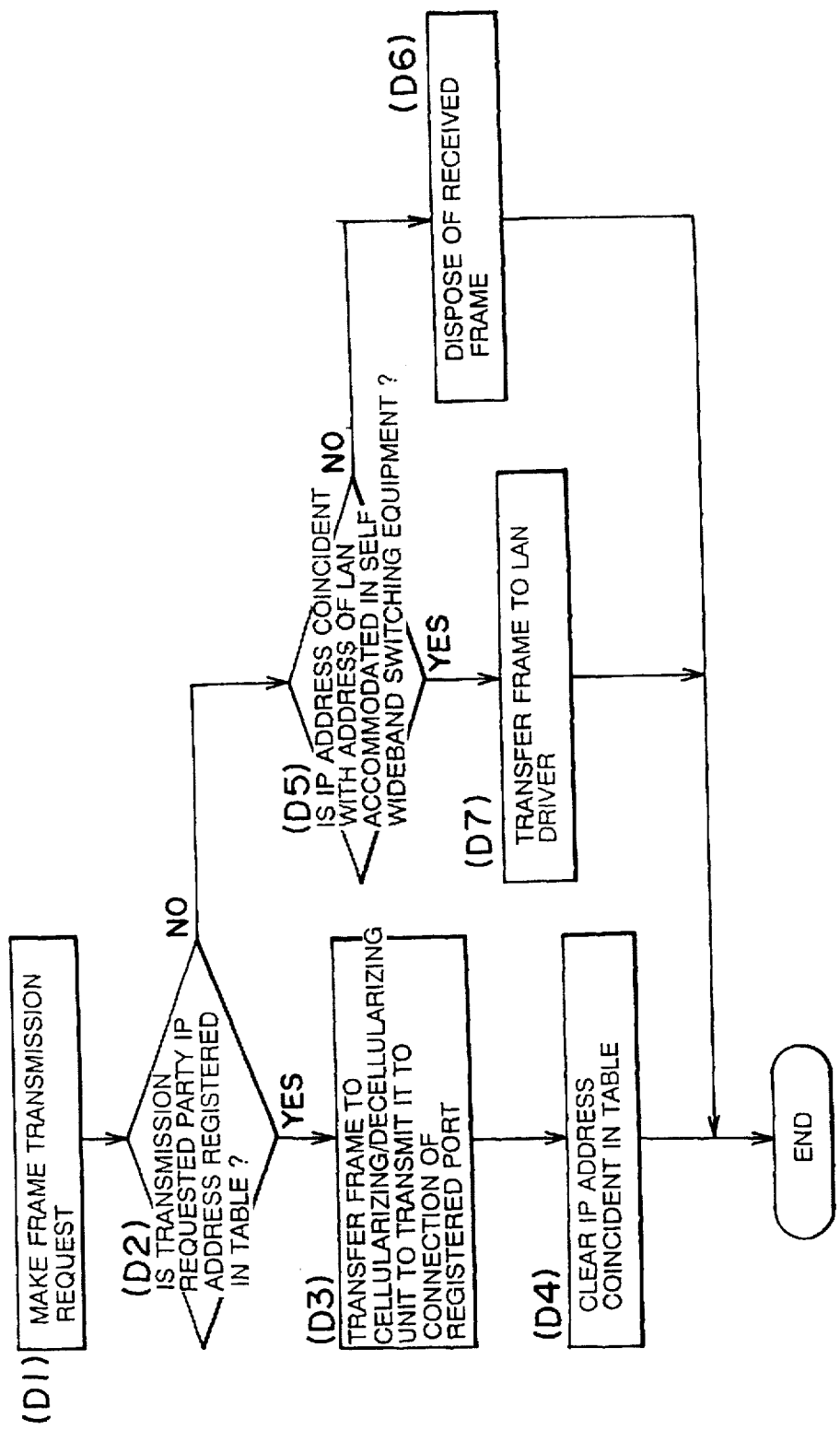
FIG. 6 is a flowchart of processes when transmitting the frame in another embodiment of the present invention.

FIG. 6 is a flowchart of processes when transmitting the frame in another embodiment of the present invention. When making a frame transmission request (D1), there is checked whether or not a transmission requested party IP address is registered as a requesting party IP address in the table TB every time a retrieval is effected per interface number (D2). If registered, a transmission frame is transferred to the segmentation and reassembly unit 6 (see FIG. 1) in order to transmit it to a connection of a registered port (D3), and there is cleared a requesting party IP address in the table TB that coincides with the transmitted IP address (D4). That is, when transmitting back the maintenance data in response to the maintenance data request, the registered IP address is unnecessary and is therefore cleared.

Further, if the transmission requested party IP address is not registered as a requesting party IP address in the table TB, there is checked whether or not the self wideband switching equipment accommodates the LAN. If accommodated therein, a LAN address thereof is compared with the transmission requested party IP address (D5). If coincident therewith as a result of the comparison, the frame is transferred to the LAN driver 8 (see FIG. 1) (D7). Whereas if not coincident as a result of the comparison, the frame is disposed of (D6).

Figure 7:
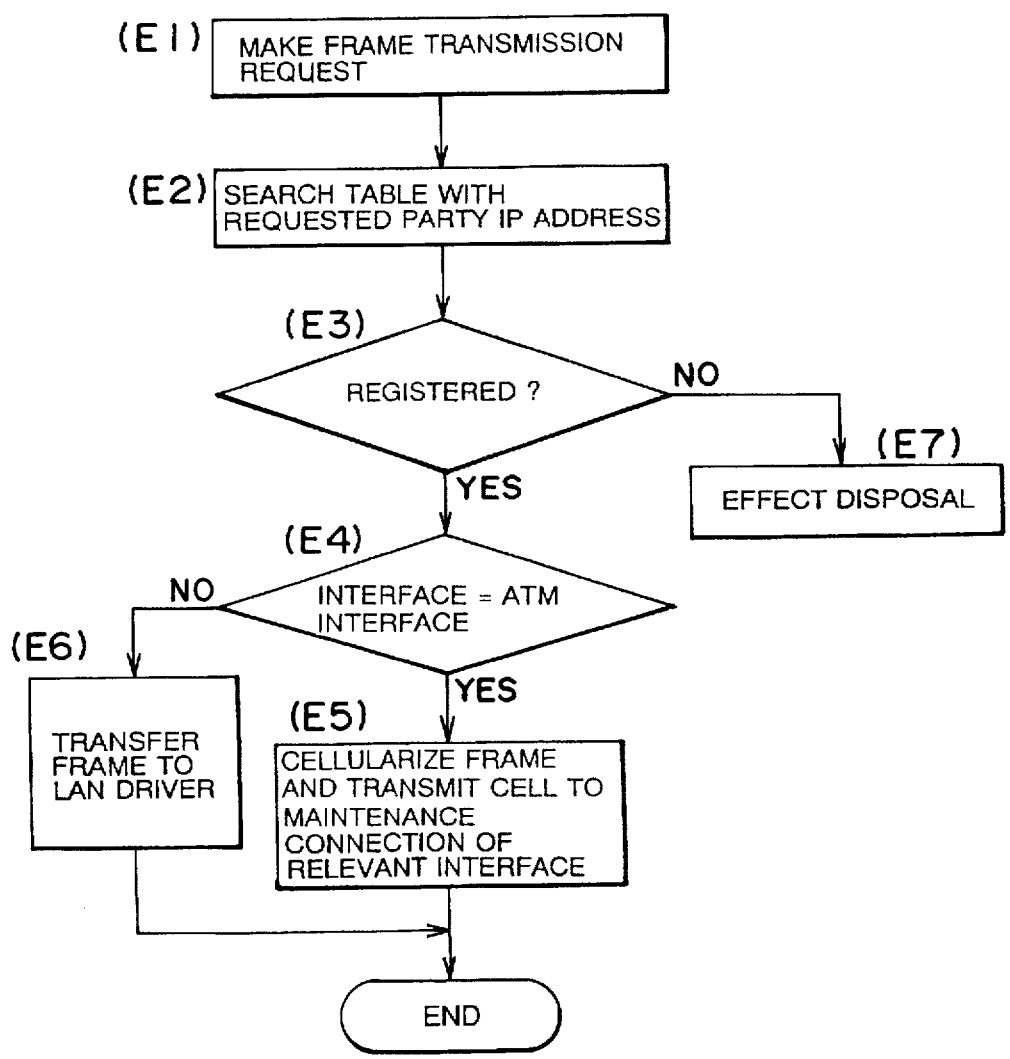
FIG. 7 is a flowchart of a transmitting process in another embodiment of the present invention.

FIG. 7 is a flowchart of the transmitting process in another embodiment of the present invention. Searched is the table TB with the requested party IP address (E2) upon a frame transmission request from the control unit of the wideband switching equipment (E1). Checked is whether or not the address is registered as the requested party IP address (E3), and, if not registered, the frame is disposed of (E7).

Whereas if registered, there is checked whether or not the interface is defined as an ATM interface (to which the wideband line is connected) (E4). In the case of the ATM interface, the frame is cellularized by the segmentation and reassembly unit 6 (see FIG. 1) and then transmitted to a maintenance connection of the relevant interface (E5). Further, if not the ATM interface, the frame is transferred to the LAN driver 8 (see FIG. 1) (E6) and transmitted to the maintenance terminal 11 via the LAN 10.

As discussed above, the IP address is not registered beforehand in the table TB, but the maintenance data requesting party IP address is registered corresponding to the interface unit which has received the frame of the maintenance data request, and the maintenance data is transmitted in response to the maintenance data request. Then, the registered IP address is cleared, thereby facilitating the management of the IP address by use of the table TB.

Further, a variety of terminals are connected through gateway devices to the interface units of the wideband switching equipment. In this case also, the present invention is applicable, wherein the gateway device can be provided with the above-mentioned table TB. Further, the LAN 10 is not confined to the Ethernet, but the LANs having a variety of constructions can be employed.

It is apparent that, in this invention, a wide range of different working modes can be formed based on the invention without deviating from the spirit and scope of the invention. This invention is not restricted by its specific working modes except being limited by the appended claims.

What is claimed is:

1. A remote maintenance control system comprising:
   a plurality of wideband switching equipments connected via a wideband line;
   a maintenance terminal connected via a local area network to at least one of said plurality of wideband switching equipments;
   an interface unit accommodating said wideband line;
   a table for registering an address of at least said plurality of wideband switching equipments to be connected to make the interface unit correspond to the address;
   control means, provided in each of said wideband switching equipments, for controlling the transfer of maintenance data and including:
   allocation means for allocating the address to each of said wideband switching equipments;
   setting means for setting a virtual channel connection for transferring the maintenance data between said wideband switching equipments; and
   selection means for selecting whether to transfer the maintenance data to other wideband switching equipment or to transfer the maintenance data to said maintenance terminal connected via the local area network with reference to said table.

2. A remote maintenance control system according to claim 1, wherein an address of the connected party through said interface unit and an item of valid/invalid data of the relevant address are set in said table.

3. A remote maintenance control system according to claim 1, wherein an address of the maintenance data requesting party is registered per said interface unit receiving the maintenance data request in said table, and
   said control unit clears the address registered in said table by transmitting the maintenance data responding to the maintenance data request.

4. A remote maintenance control system according to claim 1, wherein an address of the maintenance data requesting party and a timer value are registered per said interface unit receiving the maintenance data request in said table, and
   said control unit clears the registered address by transmitting the maintenance data responding to the maintenance data request and, in case an overtime happens by decrementing the timer value with a fixed period, clears the registered address.

5. A method according to claim 1, further comprising:
   a step of determining whether the received data is destined for another wideband switching equipment among said wideband switching equipments or not when the received data is not destined for the wideband switching equipment;
   a step of transferring the received data to the another wideband switching equipment when the received data is destined for the another wideband switching equipment;
   a step of determining whether the maintenance terminal is accommodated in the wideband switching equipment or not when the received data is not destined for the another wideband switching equipment;
   a step of discarding the received data when the maintenance terminal is not accommodated in the wideband switching equipment; and
   a step of discarding the received data when the received data is not destined for the maintenance terminal.

6. A method for transferring data among a plurality of wideband switching equipments connected to each other via wideband line and connected to at least a maintenance terminal via a local network, said method comprising:
   a step of determining whether received data in a wideband switching equipment among said wideband switching equipments is destined for the wideband switching equipment or not;
   a step of determining whether the received data is destined for the maintenance terminal or not when the maintenance terminal is accommodated in the wideband switching equipment; and
   a step of transferring the received data to the maintenance terminal when the received data is destined for the maintenance terminal.

* * * * *